(12) United States Patent
Colacecchi

(10) Patent No.: US 8,360,444 B2
(45) Date of Patent: Jan. 29, 2013

(54) MONUMENT TRANSPORT TOOL AND METHOD

(75) Inventor: Jay W. Colacecchi, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 657 days.

(21) Appl. No.: 12/287,649

(22) Filed: Oct. 11, 2008

(65) Prior Publication Data
US 2010/0090427 A1    Apr. 15, 2010

(51) Int. Cl.
*B62B 1/04* (2006.01)
(52) U.S. Cl. .......... 280/47.2; 280/47.18; 280/47.27
(58) Field of Classification Search ........... 280/47.2, 280/47.17, 47.18, 47.23, 47.27
See application file for complete search history.

(56) References Cited

U.S. PATENT DOCUMENTS

| | | | | | |
|---|---|---|---|---|---|
| D154,776 | S | * | 8/1949 | Hooz | D34/27 |
| 2,598,168 | A | * | 5/1952 | Hooz et al. | 280/641 |
| 3,064,990 | A | * | 11/1962 | Salvucci | 280/47.2 |
| 3,578,353 | A | * | 5/1971 | Lockhart | 280/47.2 |
| 3,655,212 | A | * | 4/1972 | Krass et al. | 280/641 |
| 3,850,441 | A | * | 11/1974 | Peters et al. | 280/47.2 |
| 3,873,118 | A | * | 3/1975 | Takagi | 280/47.2 |
| 4,009,891 | A | * | 3/1977 | Jensen | 280/651 |
| 4,284,286 | A | * | 8/1981 | Lewallen | 280/30 |
| 4,630,837 | A | * | 12/1986 | Kazmark | 280/47.2 |
| 4,681,330 | A | * | 7/1987 | Misawa | 280/47.2 |
| 4,728,245 | A | * | 3/1988 | Shelton | 414/490 |
| 5,160,153 | A | * | 11/1992 | Zan | 280/43.1 |
| 5,207,439 | A | * | 5/1993 | Mortenson | 280/47.2 |
| 5,445,399 | A | * | 8/1995 | Salvucci, Sr. | 280/47.27 |
| 5,658,118 | A | * | 8/1997 | Luca | 414/444 |
| 5,779,251 | A | * | 7/1998 | Meier | 280/47.2 |
| 5,810,373 | A | * | 9/1998 | Miranda | 280/47.2 |
| 5,931,483 | A | * | 8/1999 | Haynes | 280/47.19 |
| 5,947,491 | A | * | 9/1999 | Meier | 280/47.2 |
| 5,975,826 | A | | 11/1999 | Scholder | |
| 6,273,438 | B1 | * | 8/2001 | Prapavat | 280/47.21 |
| 6,364,328 | B1 | * | 4/2002 | Stahler, Sr. | 280/47.18 |
| 6,530,740 | B2 | * | 3/2003 | Kim | 414/490 |
| 6,540,242 | B1 | | 4/2003 | Raichlen | |
| 6,616,173 | B2 | * | 9/2003 | Jenkins | 280/651 |
| 7,083,174 | B2 | * | 8/2006 | Kane | 280/47.2 |
| D531,376 | S | * | 10/2006 | Tetradis | D34/24 |
| 7,255,355 | B2 | * | 8/2007 | Chisholm et al. | 280/30 |
| 7,422,229 | B2 | * | 9/2008 | Coslovi | 280/641 |
| 7,500,682 | B1 | * | 3/2009 | Del Marmol | 280/47.2 |
| 2004/0256816 | A1 | * | 12/2004 | Kane | 280/47.2 |
| 2007/0138753 | A1 | * | 6/2007 | Huang | 280/47.2 |
| 2009/0267036 | A1 | | 10/2009 | Anderson | |
| 2010/0090427 | A1 | * | 4/2010 | Colacecchi | 280/47.2 |
| 2010/0270763 | A1 | * | 10/2010 | Nassaux et al. | 280/47.2 |

* cited by examiner

*Primary Examiner* — Jeffrey J Restifo
(74) *Attorney, Agent, or Firm* — Armstrong Teasdale LLP

(57) ABSTRACT

A transport tool is disclosed for moving an aircraft monument from one location to another. The transport tool comprises an elongated, substantially rectangular, support frame having handle members at an upper region, wheel elements at a lower region, and a leg pivoted to the mid-region of the tool for supporting a load mounted to the tool as the transport tool is rotated about the wheel elements from a vertical orientation in which the load can be loaded onto, or unloaded from, the tool to a horizontal orientation in which the load can be transported from one location to another. Also disclosed is a method for transporting the load between two locations using the transport tool.

13 Claims, 5 Drawing Sheets

MONUMENT TRANSPORT TOOL AND METHOD

FIELD OF THE DISCLOSURE

The present disclosure is directed to a method and apparatus for moving heavy objects, such as aircraft monuments, from one location to another. More particularly, the disclosure concerns moving aircraft monuments from the factory to an aircraft, and through an aircraft door to an appropriate installation site within the aircraft.

BACKGROUND OF THE DISCLOSURE

Heavy objects, such as aircraft monuments comprising galleys, lavatories or other types of objects, often need to be moved from one location to another location. Until recently, moving heavy and bulky objects into an aircraft was done before completion of construction of the aircraft body.

In newer aircraft construction, preloading of monuments through aircraft body openings during construction of the aircraft is not desirable since currently used, newer, construction techniques require the completion of fabrication of all aircraft body structure before the installation of interior structural fixtures and appointments. As a result, it is more desirable to bring aircraft monuments aboard the aircraft through the passenger doorway, and the previously known devices that facilitate transport of monuments have been found to be unsafe and cumbersome to use.

In addition to being inherently unwieldy and awkward, aircraft monuments do not fit vertically through aircraft passenger doors and once in the aircraft, movement of the monuments has been known to result in damage to decorative surfaces.

Known devices for moving heavy objects include carts, dollies, and modified hand trucks. These devices, however, typically do not allow the operator to visually see the pathway or obstructions in the pathway that need to be maneuvered around. This lack of visibility leads to damage of aircraft interior structures. Further, existing devices do not permit large monuments to be transported through the aircraft passenger door. Movement of such monuments requires four to six people and repetitive lifting of interior heavy monuments may result in personal injury to those people.

A device and method are therefore needed to improve the ease of transferring aircraft monument structures from one location such as at a point of completion of fabrication to another location such as at a point of installation, and to enable movement of such monument structures through existing aircraft doorways to points of installation within the aircraft while minimizing the number of people needed to move such structures and maximizing the operators visibility during movement of the monuments.

SUMMARY OF THE DISCLOSURE

In one aspect of the disclosure, a transport tool for moving an aircraft monument from a manufacturing location to an installation location includes an elongated substantially planar support frame having handle members at one end region extending in a first direction, a support plate at a second end region extending in a second opposite direction, and wheels at the second end region extending in the second direction, a leg member pivotally attached at one end thereof to a central region of the support frame, the leg member having at least one wheel on its free end, and a biasing mechanism coupled to the frame and the leg for urging the leg into a first position where the free end is substantially proximate to the wheels at the second end region.

In another aspect of the disclosure, the transport tool is provided with at least one collapsible piston connected between the leg member and the support frame for controlling the rate of movement of the leg away from the support frame.

In another aspect of the disclosure, a method of transporting an aircraft monument from the factory to a point of installation in an aircraft using a wheeled transport tool entails positioning a support plate carried by the wheeled transport tool beneath the monument, securing the monument to the transport tool, tilting the tool and monument rearwardly so that a wheeled leg, that is mounted to the transport tool at a hinge and biased toward the tool, can pivot rearwardly under the transport tool as the tool rotates from a substantially vertical orientation to a substantially horizontal orientation, rolling the monument and transport tool while the tool is in the horizontal orientation to a point of installation in the aircraft, rotating the secured transport tool and monument into a vertical orientation, and removing the monument from the transport tool.

In yet another aspect of the disclosure, the wheels carried on the lower end of the pivoting arm are mounted to a plate member that is pivotally attached to the arm lower end.

In still another aspect of the disclosure, the handle at the first end of the support member is mounted thereto by an adjustable pivot connection, the handle being capable of being moved into one of a plurality of rearwardly facing positions relative to the first end of the support member.

Further aspects of the system and the method of using the system are disclosed herein. The features as discussed above, as well as other features and advantages of the present disclosure will be appreciated and understood by those skilled in the art from the following detailed description and drawings.

DETAILED DESCRIPTION OF THE DISCLOSURE

Embodiments of the present invention now will be described more fully hereinafter with reference to the accompanying drawing. However, many different embodiments are contemplated and the present disclosure should not be construed as limited to the embodiments set forth herein; rather, these embodiments are provided so that this disclosure will be thorough and complete and better convey the scope of the disclosure to those skilled in the art.

Figure 1:
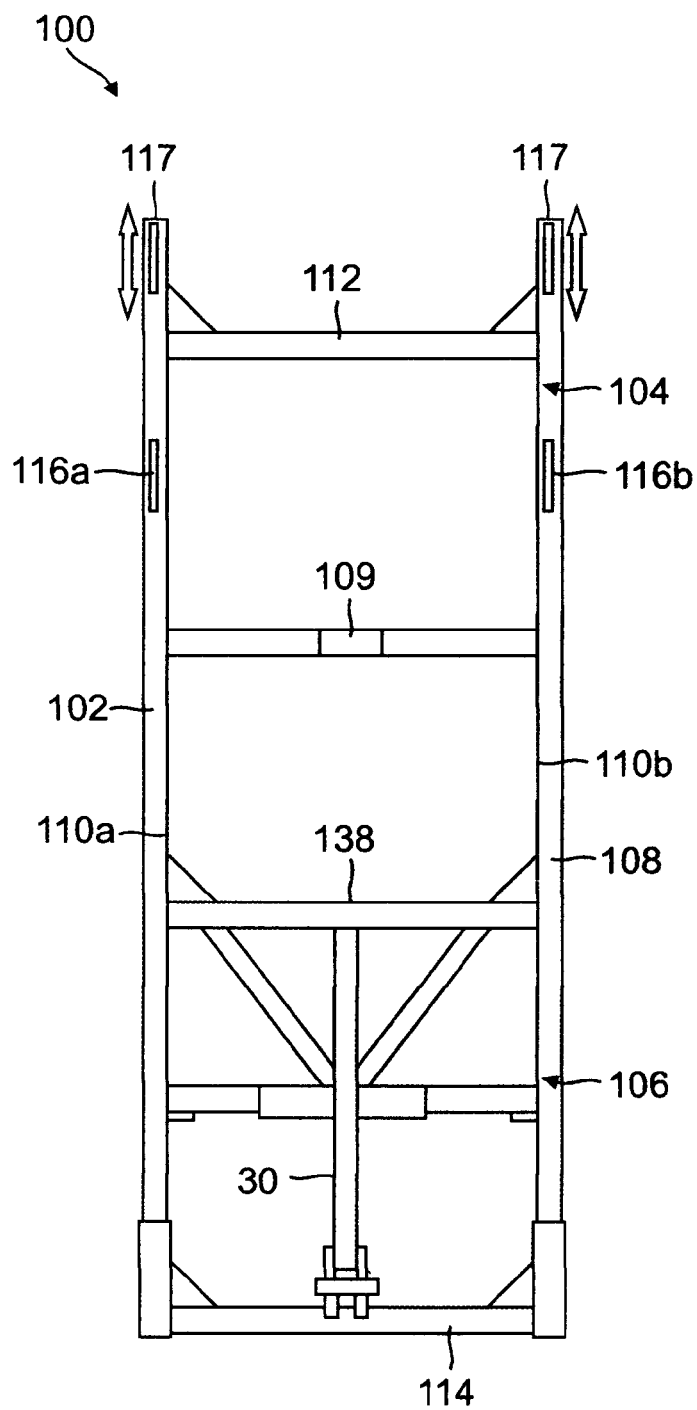
FIG. 1 is a rear view of an embodiment of the transport tool 100 of the present disclosure.
Figure 3:
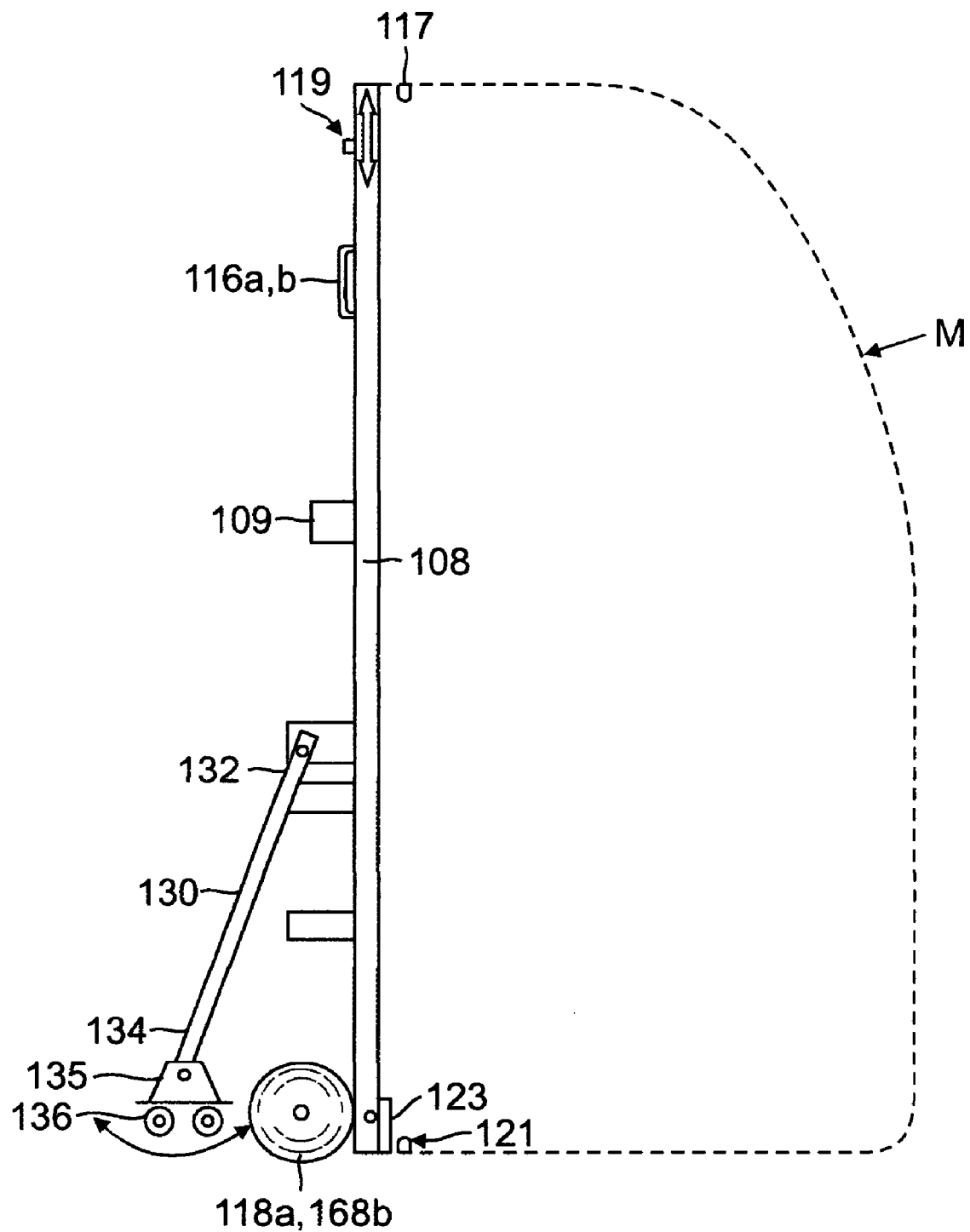
FIG. 3 is a side view of an embodiment of the transport tool 100, showing the transport tool in a vertical orientation for engagement with an aircraft monument (depicted in phantom)

Referring to FIGS. 1 and 3, the transport tool 100 of the present disclosure includes an elongated, substantially rectangular, support frame 102 having an upper region 104, a lower region 106, and a substantially central portion 108. The support frame includes substantially parallel side members 110*a* and 110*b* that are joined together at upper and lower ends by cross pieces 112 and 114 extending perpendicular to the side members. Handle members 116*a* and 116*b* extend to the rear of the transport tool 100. Handle members 116*a* and 116*b* are affixed to the side members of the transport tool and extend parallel to one another. A support frame rest member 116*c*, generally used in connection with the embodiment of the transport tool shown in FIGS. 7 and 8, functions as a support for the support frame 102 when the latter is rotated from a substantially vertical monument loading orientation to a substantially horizontal monument transport orientation (see discussion below). The support rest member 116*c* is adjustably attached to the upper ends of the side members and can be secured in one of several positions by rotating the handle member 116*c* about an axis that is substantially parallel to the cross piece 112 at the upper end of the support frame. The side members 110*a*, 110*b* and cross pieces 112, 114 together define an elongated rectangular box having a length equal to the length of the side members 110*a*, 110*b*, a width equal to the length of the cross pieces extending between the side members, and a depth equal to the width of the side members as measured from front to back. A pair of wheels 118*a*, 118*b* is mounted to the rear of the support frame lower end on opposite sides thereof. Mounted to the rear side of the support frame in both disclosed embodiments is a support leg 130.

Vertically adjustable upper fittings 117, carried by the upper end of each side member 110*a*, 110*b*, are provided to engage the upper surface of a monument M to be transported by the tool. Latch fittings 119 located on the outside of the tool side members just below the upper fittings lock the upper fittings in place once engaged with the monument upper surface. Fittings 121 are also provided on the lower end of the side members 110*a*, 110*b* for engagement with the lower surface of a monument M when the latter is supported on a frame support plate 123 at the lower end of the frame.

Figure 6:
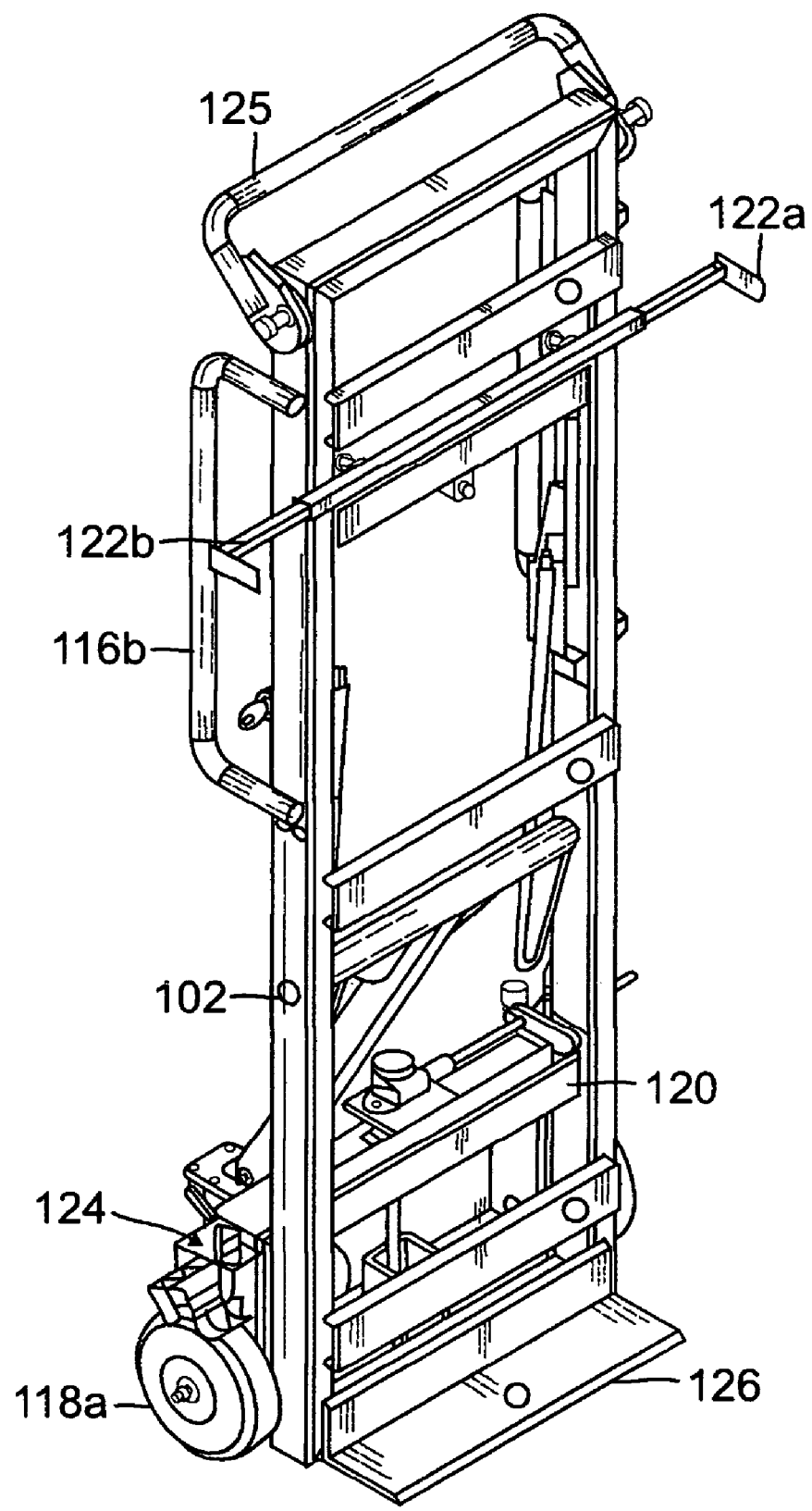
FIG. 6 is a detailed front view of the transport tool according to the present disclosure.
Figure 7:
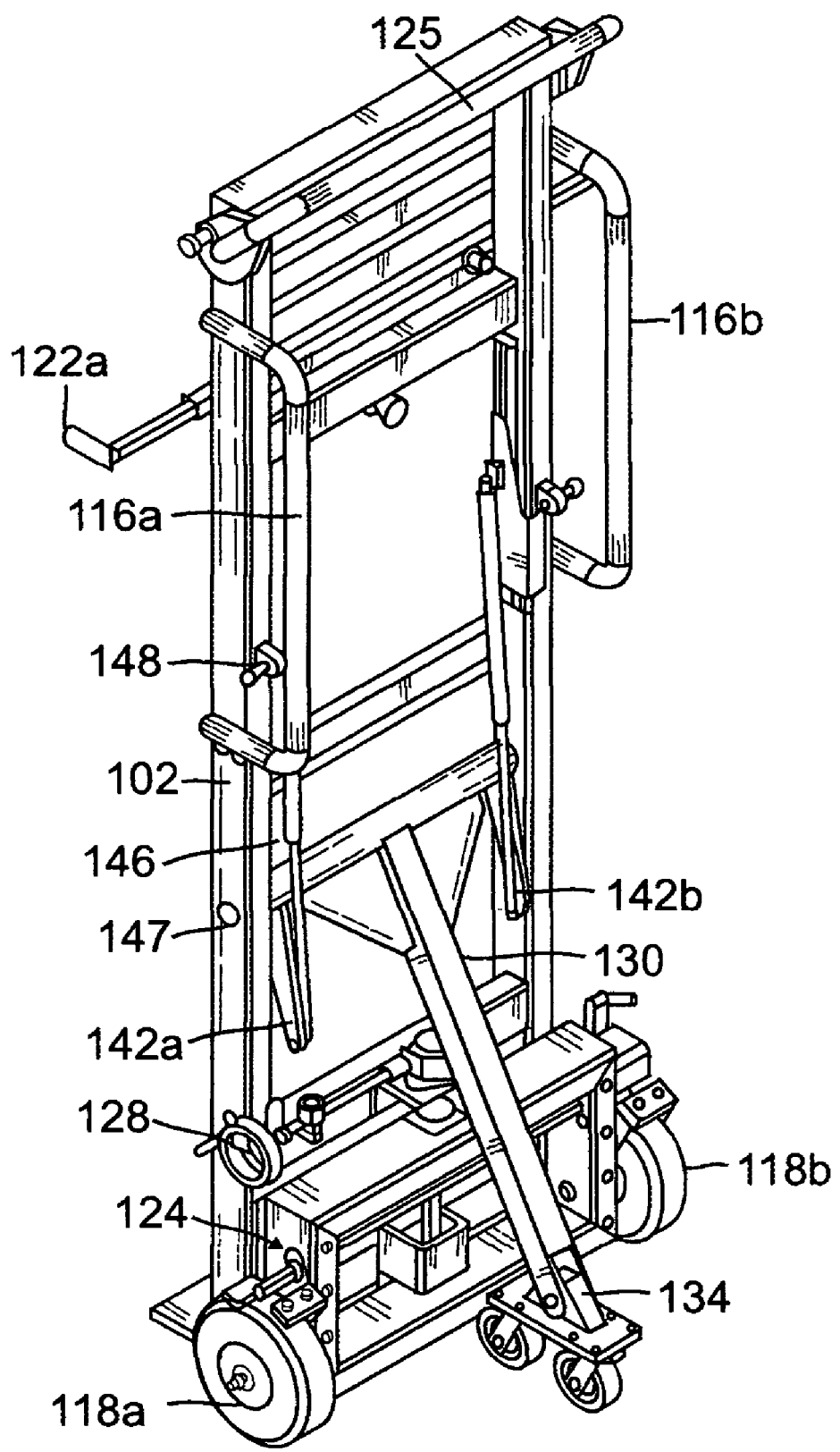
FIG. 7 is a detailed rear perspective view of an embodiment of the transport tool according to the present disclosure.

In the embodiment of FIGS. 6 and 7, the wheels are supported by a supporting structure 120 that extends transversely between the side members of the support frame. The supporting structure 120 includes a pair of arm segments 122*a*, 122*b* disposed on opposite sides of the support frame. The arm segments are laterally slidably mounted in a holder, and have ends that extend forwardly, away from the support frame, and in a direction perpendicular to the arm segments. The arm segments, with their ends, are used to grasp the sides of, and stabilize, the monument when the latter is loaded on the transport tool. A pivotally adjustable handle member 125 is provided at the upper end of the tool, which also serves as a rest member for the support frame when the latter assumes a horizontal orientation similar to that shown in FIG. 4.

An elevator assembly 124 is carried by the transport tool shown in FIGS. 6 and 7. The elevator assembly includes a vertically adjustable load supporting plate 126 positioned at the lower front of the support frame. Vertical movement of the load-supporting plate 126 is accomplished by turning a control wheel 128 disposed to one side of the support frame. By rotating the control wheel 128 in an appropriate direction, the load-supporting plate 126, on which a bottom surface of an aircraft monument is to be disposed, can be raised and lowered. For example, the support plate can be raised from a position adjacent the factory floor to a position where the upper surface is located in a plane adjacent the upper surface of a shipping pallet on which the monument is stored or shipped. Then, after loading the monument on the support plate, when it is time to deploy the monument, for example at an installation location, the support plate can be lowered to permit the monument to be moved from the support plate to the surface on which the monument is to be installed.

Figure 2:
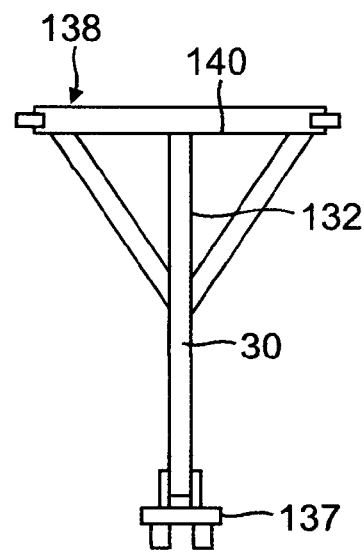
FIG. 2 shows the translating leg 30 attached to the rear of the transport tool.
Figure 5:
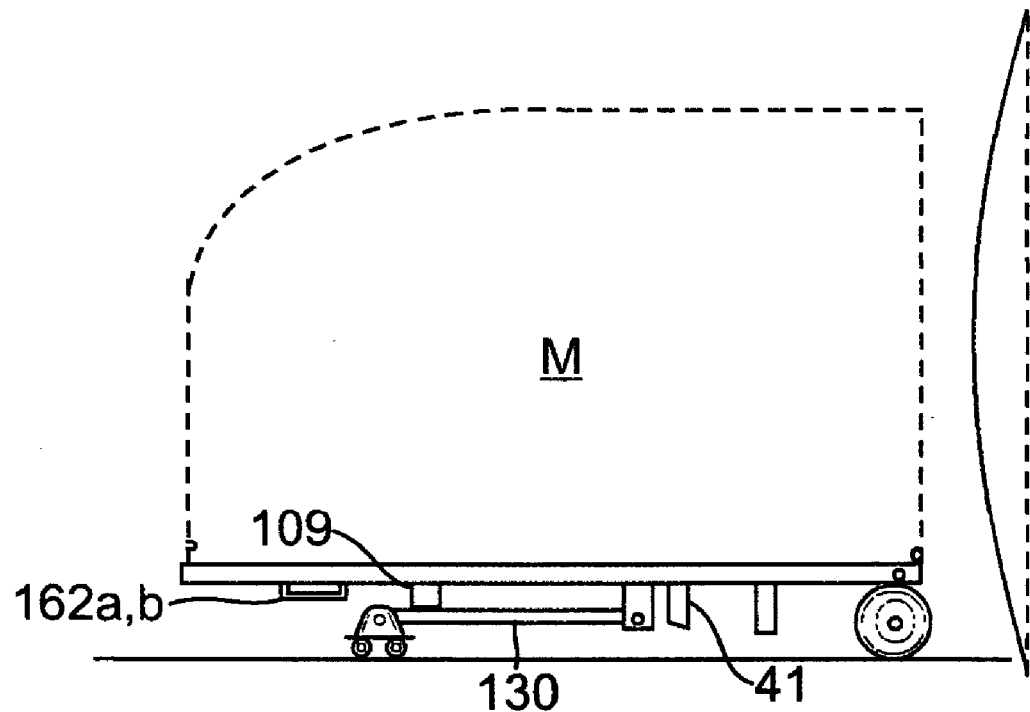
FIG. 5 illustrates a transport tool according to the present disclosure in a horizontal orientation for effecting rolling movement of the aircraft monument from one location to another.

The leg 130 shown in FIG. 2 has an upper portion 132 that is secured to a horizontally disposed hollow tubular member 138. Brace members 133 extend from the leg upper portion to the outer ends of the tubular member to render the connection of the leg to the tubular member sturdy. The tubular member is pivotably secured to and between the side members 110*a*, 110*b* of the support frame. A lower end 134 of the leg 130 carries a set of wheels or rollers 136 mounted to a plate member 135 that is pivotally connected to the lower end 134 of the leg. The wheels or rollers 136 are fully rotational to allow the entire tool and attached monument to rotate 360 degrees on the floor. At least one adjustable torsion spring 140 is housed within the tubular member 138 for the purpose of biasing the leg toward the support frame when the leg is moved away from the support frame. The length of the support leg 130 and its location on the frame 120 is designed to prevent a trip hazard when the leg is disposed in any not parallel to the frame 120. The tool is provided with an upper stop 109 and a lower stop 111 to limit the motion of the leg 130 through its range of travel (see FIGS. 3 and 5).

In the embodiment shown in FIGS. 6 and 7, the tubular member includes a pair of arms 142*a*, 142*b* extending parallel to one another, and in the direction of, and substantially parallel with, the leg. The arms 142*a*, 142*b* are arranged normal to the longitudinal axis of the tubular member. Pistons or compressible struts 144 are mounted to each of the free ends of the tubular member parallel arms. The struts exert a biasing force on the support leg to urge it to move toward the support frame 102. After the monument has been attached to the tool, as the tool is pivoted by an operator to an intermediate orientation, similar to that shown in FIG. 4 wherein the leg travels outwardly toward the operator standing to the rear of the tool, the struts elongate against a force pulling the leg back toward the support frame. In so doing, the struts apply a controlled steady force to the leg counter its movement away from the tool frame, thereby aiding in a smooth, controlled pivoting action of the tool from a vertical orientation, similar to that shown in FIG. 4, to a horizontal orientation, similar to that shown in FIG. 5. In returning the tool from the horizontal orientation, similar to that shown in FIG. 5, the operator lifts the tool to an intermediate orientation, similar to that shown in FIG. 4. Lifting of the tool is aided by the force applied by the struts to the move the leg.

Figure 4:
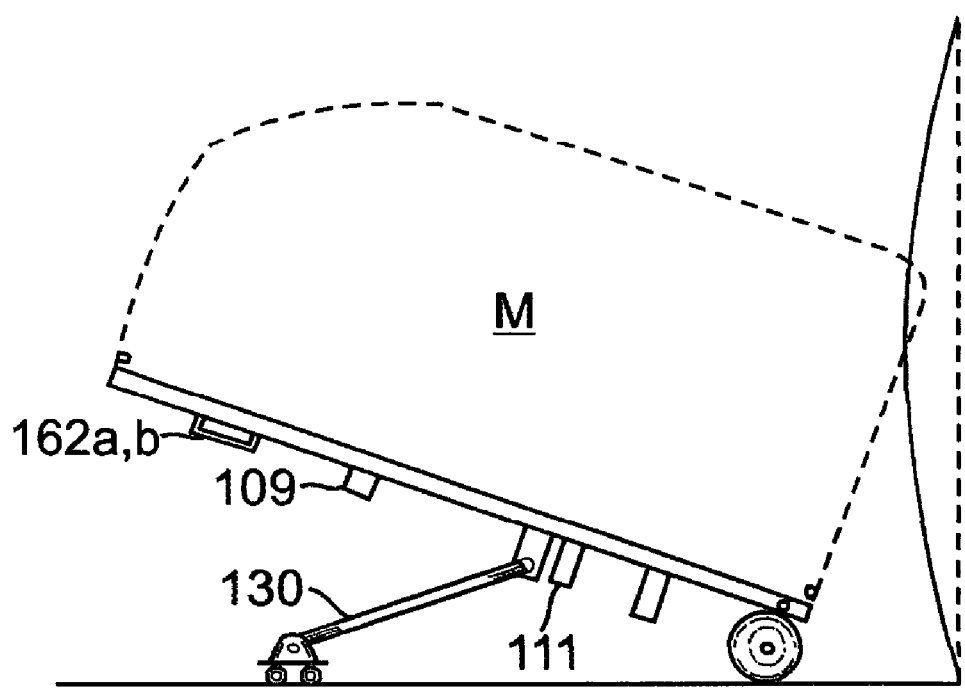
FIG. 4 shows a transport tool in an intermediate orientation for supporting an aircraft monument (shown in phantom) as the tool is being rotated from a vertical orientation to a horizontal orientation.

In both tool embodiments, the transition from an intermediate orientation, such as is shown in FIG. 4, to a vertical orientation, such as is shown in FIG. 3, involves the operator applying a lifting force toward a vertical position. However, in the embodiment of FIGS. 6 and 7, the biasing force of the struts is not strong enough to move the load to the fully vertical orientation—that is, the force exerted by the struts is not great enough to maintain the follow-through of motion to the fully vertical orientation shown in FIG. 3. This is a built-in safety feature to prevent injury to either the operator or persons working in the near vicinity of, or with, the operator. Instead, the operator must push the tool further toward the vertical orientation so that the load moves over the center of gravity. Thereafter, the operator applies a force oppositely directed to the tool to slow the tool's travel toward attaining a vertical orientation whereby the bottom of the monument is lowered to the floor.

The upper ends 146 of the struts are mounted to an upper region 148 of the support frame side members, and can be secured at a plurality of positions along the longitudinal extent of the support frame side members to alter or adjust the amount of force imparted by the struts to the parallel arms of the tubular member. The struts function to control the rate of speed of displacement of the lower end 134 of the leg from the lower region of the support frame, and its return to a position adjacent the frame.

While the disclosure has been made with reference to a preferred embodiment, it will be understood by those skilled in the art that various changes may be made and equivalents may be substituted for elements thereof without departing from the scope of this disclosure. In addition, many modifications may be made to adapt a particular situation or material to the teachings of the disclosure without departing from the essential scope thereof. Therefore, it is intended that this disclosure not be limited to the particular embodiment disclosed as the best mode contemplated for carrying out this invention, but that the disclosure will include all embodiments falling within the scope of the appended claims.

The invention claimed is:

1. A transport tool for moving an aircraft monument from a manufacturing location to an installation location, comprising:
   an elongated substantially planar support frame having handle members at a first end region extending in a first direction, a support plate at a second end region extending in a second opposite direction, and wheels at said second end region extending in said first direction,
   an upper monument engaging element configured to engage an upper surface of the aircraft monument, said upper monument engaging element positioned at the first end region,
   a lower monument engaging element configured to engage a lower side of the aircraft monument, said lower monument engaging element positioned at the second end region,
   a leg member pivotally attached at one end thereof to a central region of said support frame such that said leg member is movable between a first position, a second position, and a third position, said leg member having at least one wheel on its free end, wherein the free end is substantially proximate to the wheels at the second end region when said leg member is in the first position, the free end is remote from the wheels at the second end region when said leg member is in the second position, is adjacent to the first end region when said leg member is in the third position, and contacts said support frame when said leg member is in one of the first position and the third position, and
   a biasing mechanism coupled to said frame and said leg member for urging said leg member towards said support frame into the first position.

2. The transport tool of claim 1, wherein said biasing mechanism comprises at least one of a spring and a piston.

3. The transport tool of claim 1, wherein said biasing mechanism is carried by said support frame in the near vicinity of said central region and includes biasing elements that control the rate of pivoting movement of said leg member away from said support frame so that said support frame can be slowly rotated from a first substantially vertical orientation, in which said leg member is in the first position and the support frame can be secured to the aircraft monument, to a second substantially horizontal orientation, in which the free end of said leg member moves to at least one of the second position and the third position at a controlled rate away from the wheels at said second end region of said support frame to support the monument for movement from one location to another.

4. The transport tool of claim 3, wherein said biasing elements comprise a tubular member secured to the support frame at said central region and at least one torsion spring housed within said tubular member and coupled to said leg member.

5. The transport tool of claim 4, wherein said biasing elements further comprise at least one piston member coupled between said tubular member and said support frame for urging said leg member toward said first orientation.

6. The transport tool of claim 5, wherein said at least one piston member is compressed when said leg member free end moves away from said first position thereby countering the weight of said monument on said support frame as the latter is rotated from the first orientation to the second orientation.

7. The transport tool of claim 6, wherein said when said support frame is rotated into said second substantially horizontal orientation, the at least one piston member applies a resistive force to said leg member counteracting the movement of said leg member away from said first position.

8. The transport tool of claim 7, wherein at least one of said upper monument engaging element and said lower monument engaging element is selectively adjustable.

9. The transport tool of claim 1, and further comprising side monument engaging elements projecting forwardly from the support frame for gripping sides of the monument.

10. A tool for transporting an aircraft monument from one location to another location, comprising:
   a rectangular frame having rearwardly extending handle members at an upper end, a support plate at a lower end extending forwardly for engagement with a bottom surface of a monument, and wheels at said lower end on the rear side of said frame,
   an upper monument engaging member configured to engage an upper surface of the aircraft monument, said upper monument engaging member positioned adjacent to the upper end of said rectangular frame,
   a lower monument engaging member configured to engage a lower side of the aircraft monument and stabilize the aircraft monument relative to said rectangular frame when the aircraft monument is secured to said rectangular frame, said lower monument engaging member positioned adjacent to the lower end of said rectangular frame,
   a leg member attached at one end to a central portion of said frame such that said leg member is movable between a first position, a second position, and a third position, said leg member having at least one wheel on its other end, wherein the other end is substantially proximate to the wheels at said lower end when said leg member is in the first position, the other end is remote from the wheels at said lower end when said leg member is in the second position, is adjacent to said upper end when said leg member is in the third position, and contacts said rectangular frame when said leg member is in one of the first position and the third position, and
   a biasing mechanism coupled between said frame and said leg for urging the other end of said leg toward the wheels at said lower end and into the first position.

11. The tool of claim 10, wherein said one end of said leg member is attached to said frame at a pivot carried by said frame, said pivot facilitating rotation of said leg member thereabout, from the first position towards at least one of the second position and the third position, wherein said leg member is substantially adjacent to, and above the central portion of, said frame.

12. The tool of claim 11, wherein said leg member includes a wheel support member at its other end, said wheel support member being pivotally attached thereto.

13. The tool of claim 12 further comprising side monument engaging members that are disposed laterally of said tool frame.

* * * * *